United States Patent [19]
Hursh

[11] Patent Number: 5,852,966
[45] Date of Patent: Dec. 29, 1998

[54] REUSABLE COFFEE BREWING FILTER

[76] Inventor: M. Keith Hursh, 3015 E. Orme, Wichita, Kans. 67211

[21] Appl. No.: 862,184

[22] Filed: May 23, 1997

[51] Int. Cl.[6] .................................................. A47J 31/06
[52] U.S. Cl. .............................. 99/323; 99/304; 210/474; 210/479
[58] Field of Search .............................. 99/279, 304, 305, 99/306, 307, 308, 309, 310, 311, 312, 313, 314, 315, 317, 318, 322, 323; 210/474, 477, 478, 479, 480, 481, 469, 470

[56] References Cited

U.S. PATENT DOCUMENTS

| | | | |
|---|---|---|---|
| 1,143,239 | 6/1915 | Talbutt et al. | 99/317 |
| 2,716,937 | 9/1955 | Milano | 99/306 |
| 3,063,359 | 11/1962 | Brant | 99/322 X |
| 4,176,588 | 12/1979 | Baron | 210/474 X |
| 5,211,104 | 5/1993 | Arpin | 99/306 X |

*Primary Examiner*—Reginald L. Alexander
*Attorney, Agent, or Firm*—Kenneth Jack

[57] ABSTRACT

A coffee filter comprising a cylindrical coffee retaining ring, and a cylindrical sleeve, the cylindrical sleeve being sized and fitted so that it may be slidably mounted upon the cylindrical coffee retaining ring so that the inner surface of the cylindrical sleeve is in close proximity with the outer surface of the cylindrical coffee retaining ring; and comprising a sleeve and filter retaining means, fixedly attached to the cylindrical coffee retaining ring and to the cylindrical sleeve, such means being capable upon such slidable mounting of the cylindrical sleeve of fixedly attaching the cylindrical sleeve to the cylindrical coffee retaining ring, and being capable of retaining a sheet of filter paper so that such paper underlies and spans across the lower end of the cylindrical coffee retaining ring.

5 Claims, 3 Drawing Sheets

REUSABLE COFFEE BREWING FILTER

FIELD OF THE INVENTION

This invention relates to coffee filters. In particular, this invention relates to articles and apparatus for retaining and filtering ground roast coffee within automatic drip coffee brewing machines.

BACKGROUND OF THE INVENTION

Modern automatic drip coffee machines comprise a support structure for suspending a coffee filter basket. Such baskets typically open upwardly and have a ridged apertured floor. Typically, a circular sheet of coffee paper pressed or molded into the shape of a bowl is inserted into the interior space of such a coffee filter basket; and a measured amount of ground roast coffee is poured into the basket and into the interior space of the coffee filter. Such a coffee filter basket is then slidably installed into an automatic drip coffee machine which causes heated water to flow through its support structure, and into the upper opening of the coffee filter basket, flowing over the ground roast coffee. Solids from the ground roasted coffee are thereby dissolved into the heated water forming brewed coffee. The brewed coffee then passes through the filter paper, and through the lower aperture of the filter basket, pouring into an underlying coffee decanter. The coffee decanter typically rests upon a heating plate supported within the structural member of the automatic drip coffee machine.

The above typical configuration of an automatic drip coffee machine and filter basket presents several problems. Such coffee filter baskets are incapable of effectively utilizing plain unformed filter paper. If filter paper which is pressed into the form of a bowl of the proper shape and size is not available for use, an operator of a typical automatic drip coffee machine may not alternately insert into the coffee filter basket an unformed sheet of filter paper. Upon insertion of an unformed sheet of filter paper into a common coffee filter basket, and upon depositing of ground roast coffee upon the upper surface of such paper, granules of ground roast coffee may be undesirably washed around the outer edges of the sheet filter paper. Such a wash around effect causes coffee grounds to flow out of the filter basket and into the underlying coffee decanter. Common automatic drip coffee machines typically are unusable in absence of a supply of preformed and prefitted bowl-shaped coffee filters.

Another disadvantage of the above typical configuration of a coffee filter basket and coffee filter is that such configuration wastes coffee filter material. Where a sheet of coffee filter paper is pressed into a bowl-shaped configuration, the side walls of the bowl perform little, if any, coffee filtering function. Instead, the side walls of the bowl perform the function of retaining the ground roast coffee and preventing coffee granules from washing around the filter paper and through the apertured floor of the coffee filter basket. Utilization of preformed bowl shaped coffee filter paper for performing such coffee retaining function is economically and environmentally wasteful.

The instant inventive reusable coffee brewing filter solves the above problems by providing a pair of interlocking cylindrical rings fitted for placement within a common coffee filter basket; the rings being capable of supporting a common sheet of filter paper as a filtering membrane; and being further capable of retaining ground roast coffee without a coffee wash around effect, and without wasteful utilization of filter paper for performing a coffee retaining function.

PRIOR ART PATENTS

U.S. Pat. No. 1,920,268 issued Aug. 1, 1933, to Moriya discloses a metal coffee receptacle.

U.S. Pat. No. 3,063,359 issued Nov. 13, 1962, to Brant discloses a coffee maker.

U.S. Pat. No. 3,764,017 issued Oct. 9, 1973, to Dover discloses a infusion filter.

U.S. Pat. No. 3,795,182 issued Mar. 5, 1974, to Van Damme discloses a coffee filter.

U.S. Pat. No. 4,086,848 issued May 2, 1978, to Hahn discloses a device for brewing individual cups of coffee.

U.S. Pat. No. 4,174,659 issued Nov. 20, 1979, to Pugliese, et al., discloses a coffee brewer.

U.S. Pat. No, 4,176,588 issued Dec. 4, 1979, to Baron discloses a brewing apparatus.

U.S. Pat. No. 4,231,876 issued Nov. 4, 1980, to Zimmermann, et al., discloses a reusable coffee filter.

U.S. Pat. No. 4,255,265 issued Mar. 10, 1981, to Greutert discloses a reusable coffee filter.

U.S. Pat. No. 4,697,502 issued Oct. 6, 1987, to English, et al. discloses an apparatus for making varied strength beverages.

U.S. Pat. No. 4,832,845 issued May 23, 1989, to Hendretti discloses a permanent coffee filter.

U.S. Pat. No. 5,028,328 issued Jul. 2, 1991, to Long discloses a controlled pore size coffee filter.

None of the above disclosed patents teach, disclose, or describe the novel, inventive, unique and useful aspects and features of the present inventive reusable coffee brewing filter.

SUMMARY OF THE INVENTION

The instant inventive reusable coffee brewing filter comprises a circular ring, similar in construction to a common automatic drip coffee filter basket having its floor removed, the cylindrical ring being fitted for insertion into the interior space of a common coffee filter basket. Just as the side walls of a common automatic drip coffee filter basket slope inwardly from a large upper opening to a slightly smaller lower floor, the wall of the cylindrical ring slopes inwardly. The diameter of the cylindrical ring preferably is fitted to substantially span the diameter of the interior space of a common automatic drip coffee filter basket. The lower end of the cylindrical ring preferably has an annular and convex ridge extending radially outward.

A second component of the instant reusable coffee brewing filter is a cylindrical sleeve which is fitted for slidable mounting over the lower end of the cylindrical ring. The interior surface of the cylindrical sleeve has a plurality of vertically spaced annular channels therearound, each annular channel being fitted for receiving and holding the annular ridge of the cylindrical ring. An acceptable alternate construction of the coffee filter reverses the placement of the ridge and annular channels, positioning the channels within the outer wall of the cylindrical ring and positioning the ridge so that it extends inwardly from the inner wall of the cylindrical sleeve.

In use, the cylindrical sleeve is placed upon a table top, its upper end being upwardly oriented. A sheet of filter paper is then placed over the cylindrical sleeve, totally covering its upper end. Preferably, the filter paper is cut to a size allowing its outer edges to extend beyond the lip of the upper end of the cylindrical sleeve approximately one inch. The lower end of the cylindrical ring is then pressed downward into the upper end of the cylindrical sleeve, drawing downward with it the filter paper. Upon further downward motion of the cylindrical ring, its lower edge will come into contact with the upper surface of an inwardly extending flange positioned at its lower edge. The cylindrical ring is then upwardly withdrawn causing its annular ridge to snap in place within the middle or uppermost annular channel, leaving a bowl shaped membrane of filter paper underlying the lower edge of the cylindrical ring. Ground roast coffee is then poured into the interior space of the coffee filter, and the filter is placed into the interior space of a common automatic drip coffee filter basket. There, the reusable coffee brewing filter functions in much the same way as a preformed bowl-shaped coffee filter; the side walls of the reusable coffee brewing filter retaining the coffee grounds and the heated water, and the filter separating the coffee grounds from the water containing dissolved coffee solids.

Accordingly, it is an object of the present invention to provide a reusable coffee brewing filter having a first ring for retaining coffee and heated water, and having an interlocking second ring for retaining and forming an unformed sheet of filter paper into a bowl shaped membrane spanning across the lower opening of the first ring.

It is a further object of the present invention to provide a reusable coffee brewing filter which is capable of utilizing plain unformed filter paper, without necessitating the provision of a supply of bowl-shaped preformed filter papers.

It is a further object of the present invention to provide a reusable coffee brewing filter which avoids economic and environmental waste resulting from utilization of coffee filter paper to perform a coffee granule retention function.

Other and further objects, benefits, and advantages of the present invention will become known to those skilled in the art upon review of the Detailed Description which follows, and upon review of the appended drawings.

DETAILED DESCRIPTION OF THE PREFERRED EMBODIMENT

Figure 1:
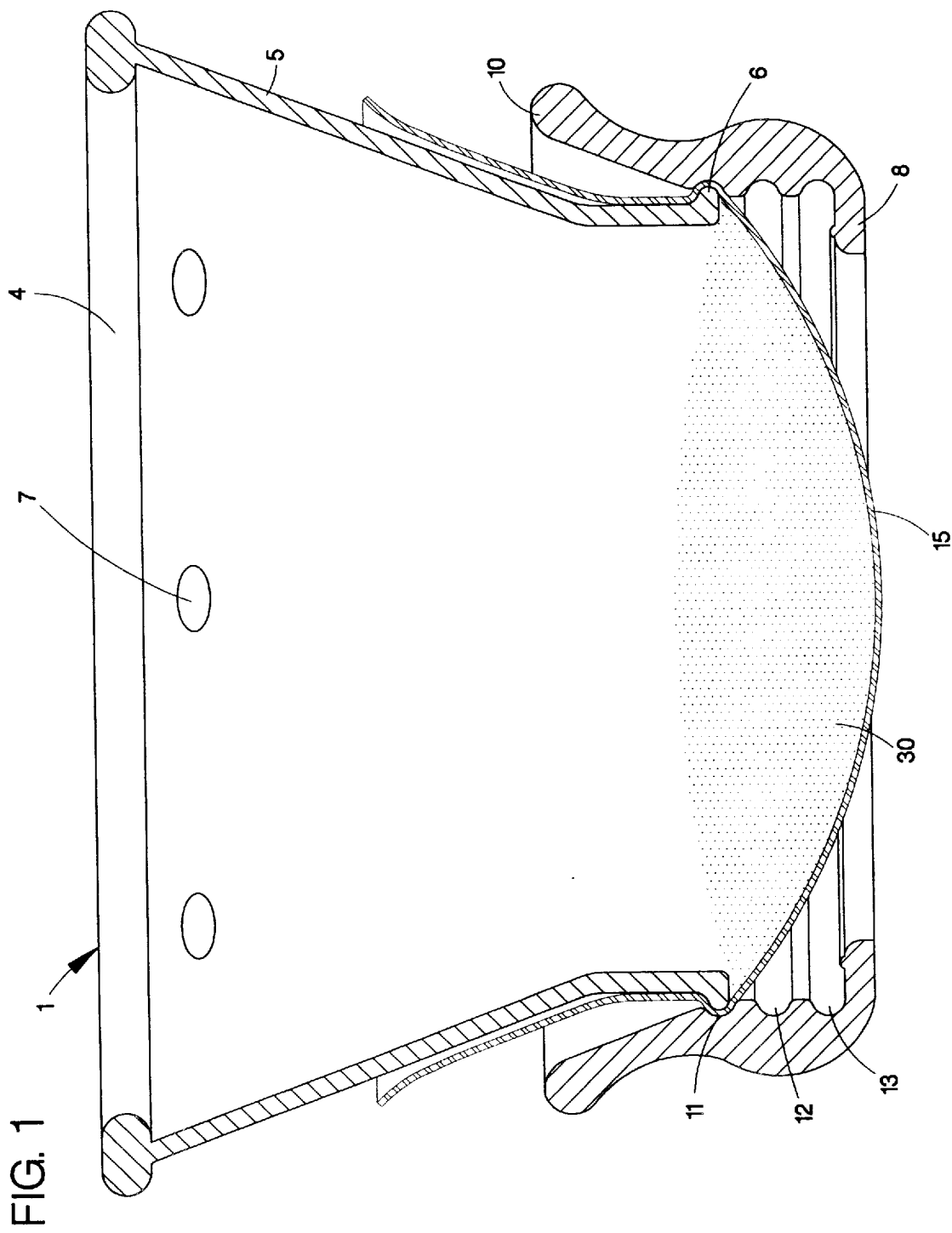
FIG. 1 is a side sectional view of the reusable coffee brewing filter containing coffee grounds, the plane of the section containing the central vertical axis of the filter.

Referring now to the drawings, and in particular to FIG. 1, the reusable coffee brewing filter, including all of its components and features, is generally designated as Element 1. The major structural element of the coffee brewing filter 1 is a coffee retaining ring 5. The diameter and height of the coffee retaining ring 5 preferably are sized and fitted allowing the coffee retaining ring 5 to be inserted, referring to FIG. 3, into the interior space of a common automatic drip coffee machine filter basket 25. As common automatic drip coffee machine filter baskets 25 slope inwardly from a large upper opening to a smaller lower floor, the wall of the coffee retaining ring 5 also preferably inwardly slopes. The coffee retaining ring 5 preferably is composed of high strength heat resistant plastic. Referring to FIG. 1, the upper lip of the coffee retaining ring 5 is preferably enlarged, for prevention of cracking of the plastic wall. The lower end of the coffee retaining ring 5 is preferably downwardly turned to a vertical orientation, and the lower lip of the coffee retaining ring 5 has an annular ridge 6 extending radially outward.

The annular ridge 6 of the coffee retaining ring 5 is fitted so that it is capable of selectively interlocking within one of the annular channels 11, 12, or 13 within the inner wall of a circular filter retaining sleeve 10. The filter retaining sleeve 10 is fitted for slidable mounting over the lower end of the coffee retaining ring 5. As the filter retaining sleeve 10 is moved over the lower end of the coffee retaining ring 5 toward its upper end, the annular ridge 6 selectively engages with the annular channels 11, 12, or 13.

Figure 3:
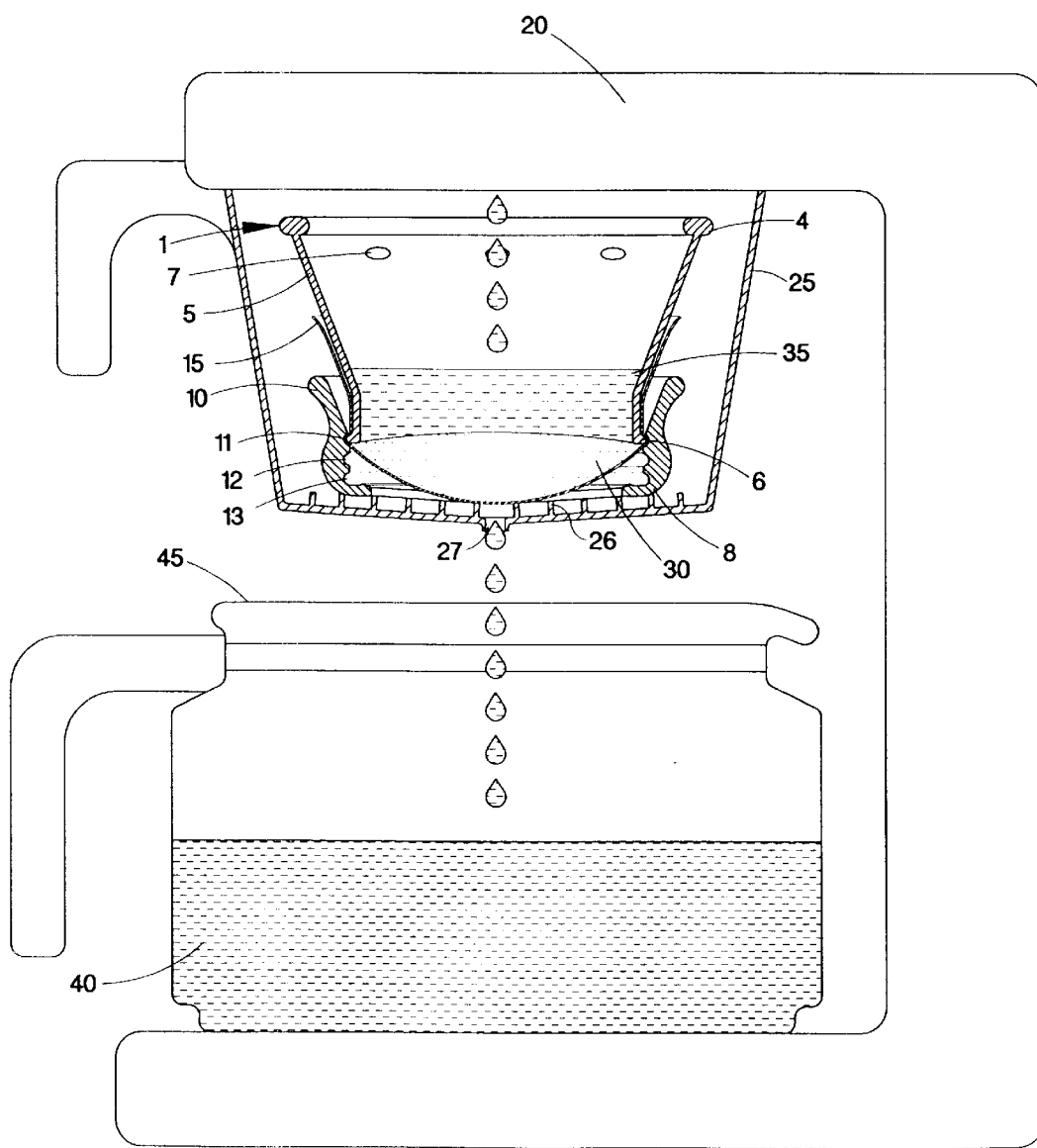
FIG. 3 is a side sectional view of the reusable coffee brewing filter showing the filter in use within an automatic drip coffee machine.

Referring simultaneously to FIGS. 1 and 3, the side wall of the coffee retaining ring 5 preferably has a plurality of steam vent apertures 7, which allow steam and heated water to emit therefrom without allowing the coffee filter 1 to overfill.

In use, referring to FIG. 1, the filter retaining sleeve 10 is placed on a table top or countertop surface so that its upper end is upwardly oriented. A sheet of common filter paper 15 is then placed over the upper opening of the filter retaining sleeve 10. Preferably, the filter paper is trimmed so that its edges extend at least one inch in all directions beyond the lip of the upper end of the filter retaining sleeve 10. The coffee retaining ring 5 is then pressed downwardly into the upper end of the filter retaining sleeve, causing the filter paper 15 to extend downward, between the filter retaining sleeve 10 and the coffee retaining ring 5. Upon further downward motion of the coffee retaining ring 5 with respect to the filter retaining sleeve 10, the lower edge of the coffee retaining ring 5 will come into contact with the upper surface of an inwardly extending annular flange 8. The coffee retaining ring 5 is then upwardly withdrawn, causing its annular ridge 6 to snap into place within the second annular channel 12 or the uppermost annular channel 11. The upward motion of the cylindrical ring 5 does not draw with it the filter paper 15; leaving a cup shaped filter membrane spanning across the lower end of the cylindrical ring 5.

Figure 2:
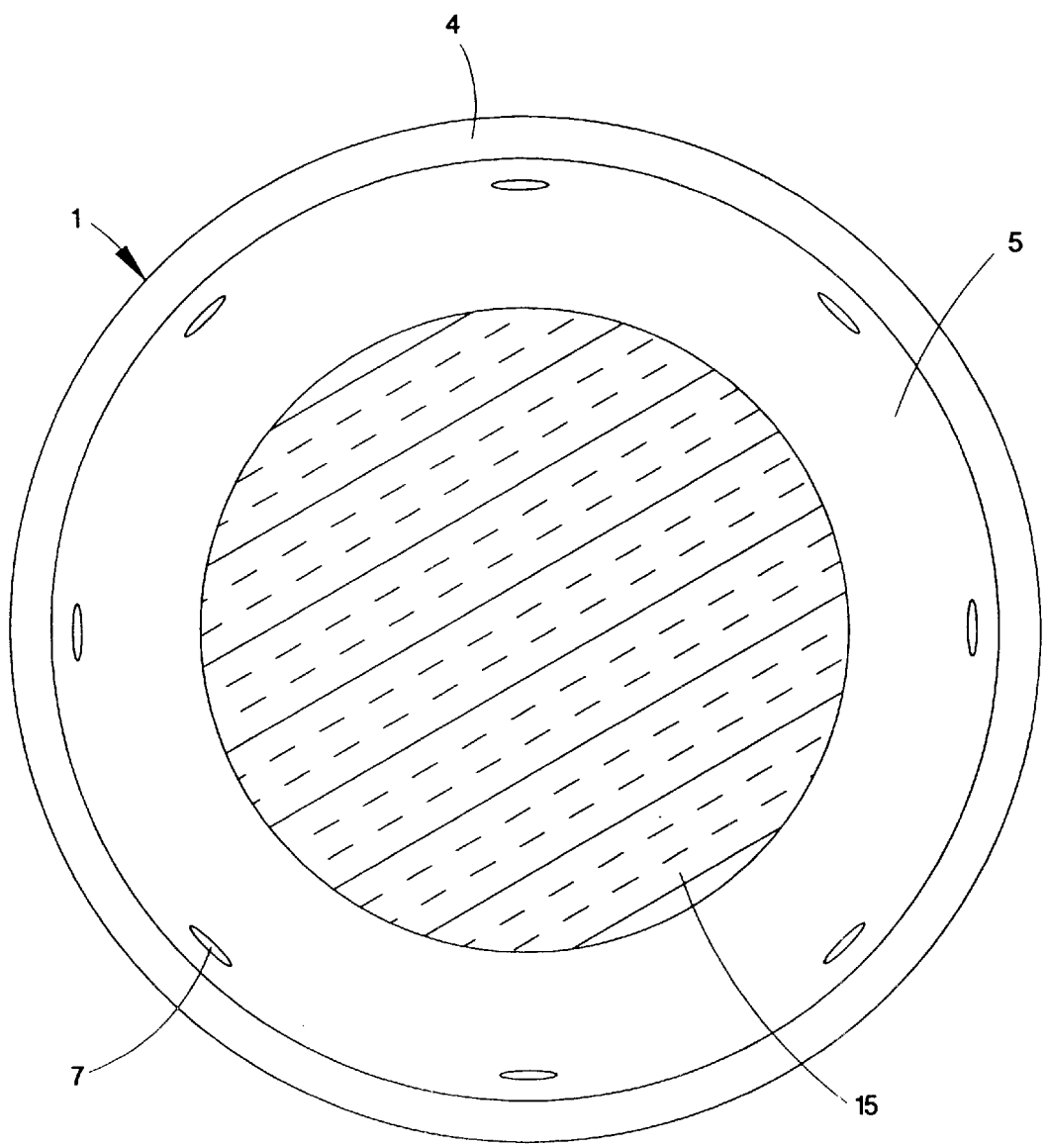
FIG. 2 is a plan view of an empty reusable coffee brewing filter.

Referring simultaneously to FIG. 1 and FIG. 2, upon such an installation of the filter paper 15 to form a cup or bowl shaped filtering membrane spanning across the coffee brewing filter 1, a measured amount of ground roast coffee 30 is poured into the upper opening of the retaining ring 5. Referring to FIG. 3, the reusable coffee brewing filter 1 is shown in use within a common coffee filter basket 25, slidably installed within a common automatic drip coffee maker 20. The coffee filter 1 is supported by ridges 26 extending upwardly from the floor of the filter basket 25. Ground roast coffee 30 is then poured into the upper opening of the coffee retaining ring 5. Heated water 35 is then caused to pour out of the automatic drip coffee maker 20 into the interior space of the coffee retaining ring 5 to intermix with the ground roast coffee 30. Upon intermixing of the heated water 35 with the ground roast coffee 30, the heated water is infused with dissolved solids from the coffee grounds 30, forming brewed coffee 40. The heated water 35 containing the dissolved coffee solids then passes through the filter paper 15 to drip through the lower aperture 27 of the coffee filter basket 25, filling the coffee decanter 45 with the brewed coffee 40.

Referring simultaneously to FIGS. 1 and 3, the above described inventive reusable coffee brewing filter 1 is particularly advantageous because it allows common unformed filter paper to be utilized within a coffee filter basket 25 rather than requiring a supply of bowl-shaped preformed coffee filters. Common unformed filter paper is more economically obtained than such preformed bowl-shaped filter paper. The coffee filter 1 also provides economic and environmental benefits because the side wall of the coffee retaining ring 5 performs the function of retaining the coffee 30 without allowing the coffee 30 to wash around the outer edges of the filter paper 15, rather than utilizing the side walls of a preformed bowl-shaped filter paper to perform such function. Thus, a wasteful use of filter paper is eliminated through utilization of the reusable coffee brewing filter 1.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A coffee filter comprising:
    (a) a cylindrical coffee retaining ring having an upper end, a lower end, an outer surface, and having an inner surface;
    (b) a cylindrical sleeve having an upper end, a lower end, an outer surface, and having an inner surface, the cylindrical sleeve being sized and fitted so that it may be slidably mounted upon the cylindrical coffee retaining ring so that the inner surface of the cylindrical sleeve is in close proximity with the outer surface of the cylindrical coffee retaining ring;
    (c) a sleeve and filter retaining means, such means being fixedly attached to or being a homogeneous part of the cylindrical coffee retaining ring and of the cylindrical sleeve, such means being capable, upon such slidable mounting of the cylindrical sleeve, of fixedly attaching the cylindrical sleeve to the cylindrical coffee retaining ring, and such means being capable of retaining filter paper so that such paper underlies and spans across the lower end of the cylindrical coffee retaining ring, the sleeve and filter retaining means so fixedly attaching the cylindrical sleeve to the cylindrical coffee retaining ring; the sleeve and filter retaining means comprising an annular filter paper receiving channel and an annular filter paper compressing ridge, the interior space of such channel and the outer surface of such ridge each extending outwardly from the outer and inner surfaces of the cylindrical coffee retaining ring and cylindrical sleeve, such channel and such ridge being fitted and positioned so that upon such slidable mounting of the cylindrical sleeve upon the cylindrical coffee retaining ring, and upon positioning of filter paper between the inner surface of the cylindrical sleeve and the outer surface of the cylindrical coffee retaining ring, such ridge may extend into such channel, such ridge there compressing and fixedly attaching such paper to the coffee filter so that such paper forms a coffee filtering membrane spanning across the lower end of the cylindrical coffee retaining ring; the sleeve and filter retaining means further comprising a plurality of second annular filter paper receiving channels, each such channel opening inwardly and the interior space of each such channel extending radially outward from the inner surface of the cylindrical sleeve; and each such channel being capable of selectively and adjustably receiving and retaining the annular filter paper compressing ridge of the cylindrical coffee retaining ring.

2. The coffee filter of claim 1, further comprising an annular flange fixedly attached to or being a homogeneous part of the cylindrical sleeve, the annular flange extending inwardly from the inner surface of the cylindrical sleeve, and being positioned below the lowermost annular filter paper receiving channel.

3. The coffee filter of claim 2, wherein the cylindrical coffee retaining ring has a plurality of steam venting apertures therethrough, each such aperture extending from the outer surface of the cylindrical coffee retaining ring to its inner surface.

4. The coffee filter of claim 3, wherein the diameter of the upper end of the cylindrical coffee retaining ring is greater than the diameter of its lower end.

5. The coffee filter of claim 4, wherein the cylindrical coffee retaining ring has a substantially circular horizontal cross-sectional shape.

\* \* \* \* \*